W. B. BULL.
METHOD OF PURIFYING WATER.
APPLICATION FILED MAR. 24, 1911.
1,012,808.
Patented Dec. 26, 1911.
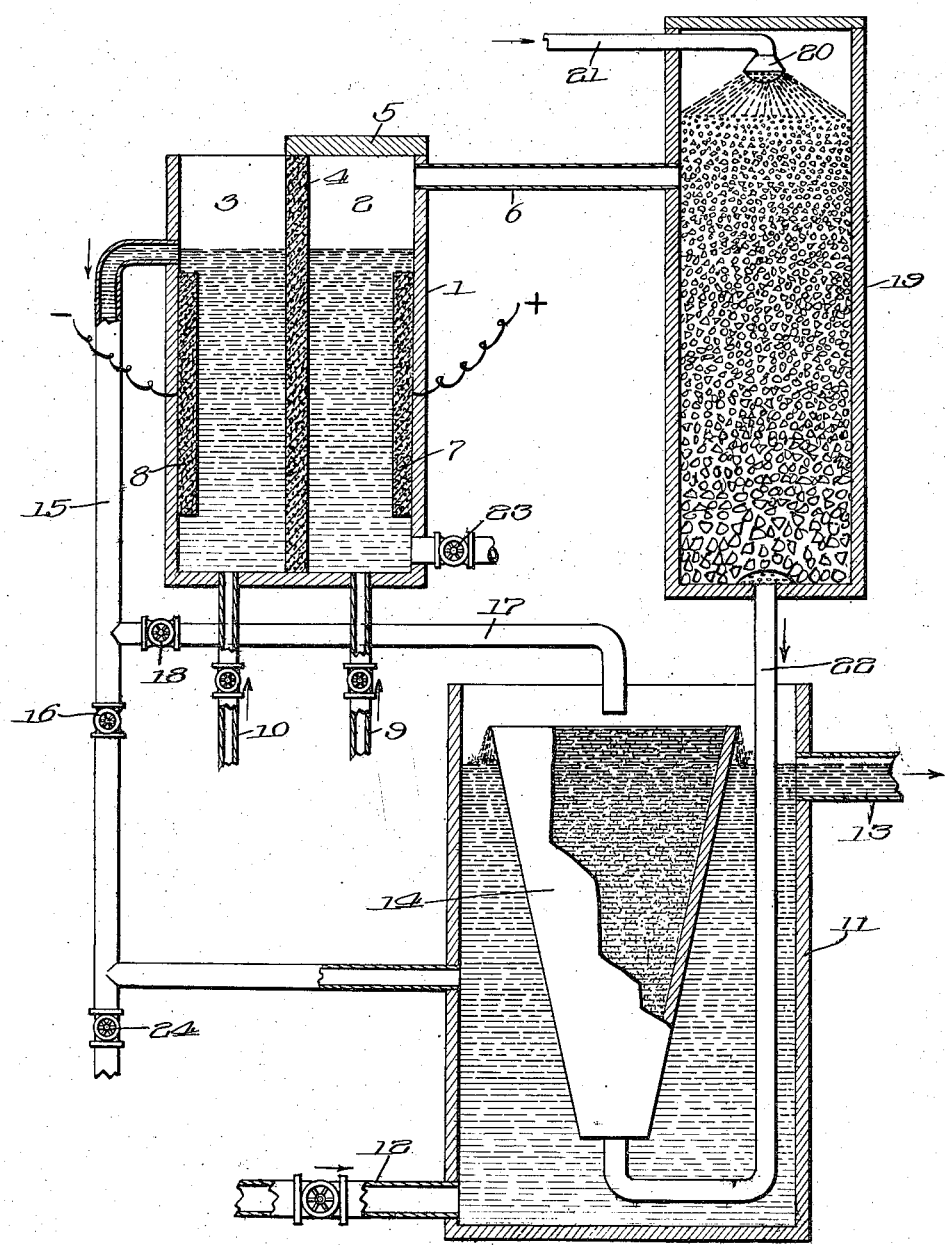

UNITED STATES PATENT OFFICE.

WILLIAM B. BULL, OF CHICAGO, ILLINOIS, ASSIGNOR TO CHLORIDE PROCESS COMPANY, OF CHICAGO, ILLINOIS, A CORPORATION OF ILLINOIS.

METHOD OF PURIFYING WATER.

1,012,808. Specification of Letters Patent. Patented Dec. 26, 1911.

Application filed March 24, 1911. Serial No. 616,731.

*To all whom it may concern:*

Be it known that I, WILLIAM B. BULL, a citizen of the United States, residing at Chicago, in the county of Cook and State of Illinois, have invented a new and Improved Method of Purifying Water, of which the following is a specification, reference being had to the accompanying drawing.

My invention relates to the purification of water for potable purposes and has especially to do with the removal of the impurities by coagulation and subsequent filtration or sedimentation.

It has for its object to provide an improved process for economically producing an efficient coagulating agent and supplying the same to the water to be purified so that the operation of treating the water may be carried on continuously and at such low cost as will make the process generally practicable.

Letters Patent of the United States, No. 982,704, granted to me January 24, 1911, have to do with a process of purifying water, in which a solvent of iron is formed by electrolysis, such solvent being used to form a solution of an iron compound capable of precipitation to form a hydroxid coagulant which is used to effect the coagulation of the impurities contained in the water. My present invention also contemplates the production of a solution of an iron compound capable of precipitation to form the coagulating agent and includes electrolysis in the production of the iron solvent, but differs from said patented process in that it consists in forming a gaseous product containing chlorin by the electrolytic action and subjecting the iron to the action of such gas in the presence of water, thereby forming a solution of an iron salt. The chlorin containing gaseous product is produced in the anode chamber of an electrolytic apparatus by electrolyzing a saline solution by the use of an inert anode, and after being separately removed from the anode chamber is employed to impregnate water, the chlorin containing solution so formed being then passed through a mass of comminuted iron, thereby producing a solution of an iron compound. The iron salt solution is then introduced into the water to be purified and is either allowed to precipitate by the action of the alkaline constituents of the water, or may be precipitated by the introduction into the water of the alkaline solution formed in the cathode chamber, or by means of any other suitable precipitating agent. By this process the strength of the iron solvent produced may be regulated as desired, and in that way the character of the iron salt solution obtained may be varied, either a ferric or a ferrous salt being produced at pleasure. Furthermore, by employing an excess of chlorin in the solvent solution a greater or less proportion of free chlorin may be introduced, along with the iron solution, into the water to be purified, thereby obtaining the advantage of the germicidal qualities of the chlorin.

In the drawing, which is a sectional view illustrating the several parts of the apparatus, I have shown a simple form of apparatus for carrying out my said process.

As therein shown, 1 indicates an electrolytic cell having an anode chamber 2 and a cathode chamber 3 separated by a porous diaphragm 4 of any suitable material. As shown, the upper end of the anode chamber 2 is closed by a cover 5.

6 indicates an outlet pipe near the upper end of the anode chamber through which the gas generated passes out, and 23 indicates a valved outlet-pipe near the bottom of said chamber through which the liquid contents thereof may be withdrawn.

7 indicates the anode, which is of Acheson graphite or other suitable material, and is placed in such position in the anode chamber as to be immersed wholly or partially in the liquid therein.

8 indicates the cathode, which may be of any suitable material.

9—10 indicate inlet pipes for supplying the electrolyte to the anode and cathode chambers. In practice water is admitted through one of said pipes and a common salt solution through the other. Said pipes are provided with valves for regulating the flow therethrough.

11 indicates a receptacle for the water to be purified, having a valved inlet-pipe 12 near the bottom thereof, and an outlet-pipe 13 at the upper portion thereof.

14 indicates a funnel-shaped receptacle arranged within the receptacle 11 and adapted to contain iron in comminuted form.

15 indicates a pipe leading from the upper portion of the cathode chamber to the receptacle 11, said pipe having a valve 16.

17 indicates a branch pipe extending from the pipe 15 to a point over the receptacle 14 so that the solution formed in the cathode chamber may be discharged directly into the receptacle 14. The pipe 17 is provided with a valve 18.

24 indicates a pipe for separately discharging the solution formed in the cathode chamber, when desired.

19 indicates a mixing chamber adapted to contain coke or other inert material, said receptacle having a rose 20, or other water distributing device, at its upper end, connected with a supply pipe 21 so that water may be introduced, preferably in the form of a spray, at the upper portion of said chamber 19. The pipe 6 leading from the anode chamber communicates with the chamber 19.

The action of the electric current supplied to the anode and cathode is to effect the decomposition of the saline solution, a gaseous product containing chlorin being formed in the anode chamber and rising through the liquid therein to the upper portion of said chamber, the level of the liquid therein being considerably below the opening to the outlet-pipe 6. The level of the solutions in the anode and cathode chambers is automatically regulated by transfusion through the porous diaphragm 4. The gas formed in the anode chamber passes out through pipe 6 to the mixing chamber 19, where it is taken up by the water supplied thereto, which becomes impregnated therewith, forming a chlorin containing solution of greater or less strength, depending upon the relative volumes of chlorin and water passing through said chamber. This solution passes out of the mixing chamber 19 through a pipe 22 which communicates with the lower portion of the receptacle 14 so that the chlorin containing solution is caused to pass upward through the comminuted iron, which is acted upon to produce an iron solution, which overflows into the water contained in the receptacle 11, as indicated in the drawing. If the water is already sufficiently alkaline to effect the precipitation of the iron salt in solution, the introduction of a further precipitating reagent is unnecessary, but if desired the solution formed in the cathode chamber may be introduced thereinto, as described in my said patent, this being accomplished by opening either of the valves 16 or 18. By properly regulating the strength of the chlorin containing solution and the rate of its flow through the comminuted iron, a greater or less percentage of free chlorin may be introduced into the water to be purified, as hereinbefore suggested.

It will be understood that while my improved process contemplates more particularly the production of chlorin gas and its use in connection with iron, my invention is not restricted to the use of such substances, but contemplates also the use of other equivalent materials.

What I claim as my invention, and desire to secure by Letters Patent, is,—

1. The method of purifying water, comprising electrolyzing a saline solution by the use of an inert anode to form a gaseous product containing chlorin, conducting the gas from the anode chamber to an exterior receptacle containing water, impregnating the water with said gas, subjecting iron to the action thereof to form a coagulating agent, and treating the water to be purified with such coagulating agent.

2. The method of purifying water, comprising electrolyzing a saline solution by the use of an inert anode to form a gaseous product containing chlorin, impregnating water in a separate receptacle with the gas, subjecting iron to the action of the solvent so formed, and treating the water to be purified with the resulting reagent.

3. The method of purifying water, which consists in producing a gaseous product containing chlorin by electrolysis, impregnating water in a separate receptacle with the gas so formed, subjecting iron to the action of the resulting solvent, and using the reagent so formed to coagulate the impurities contained in the water to be purified.

WILLIAM B. BULL.

Witnesses:
JOHN L. JACKSON,
W. H. DE BUSK.